United States Patent
Suh et al.

(10) Patent No.: US 12,323,853 B2
(45) Date of Patent: Jun. 3, 2025

(54) LOW POWER INDOOR FRAME FORMAT

(71) Applicants: Jung Hoon Suh, Ottawa (CA); Yan Xin, Ottawa (CA); Osama Aboul-Magd, Ottawa (CA)

(72) Inventors: Jung Hoon Suh, Ottawa (CA); Yan Xin, Ottawa (CA); Osama Aboul-Magd, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 653 days.

(21) Appl. No.: 17/403,521

(22) Filed: Aug. 16, 2021

(65) Prior Publication Data

US 2022/0060941 A1    Feb. 24, 2022

Related U.S. Application Data (60) Provisional application No. 63/069,556, filed on Aug. 24, 2020.

(51) Int. Cl.
*H04W 28/06* (2009.01)
*H04L 1/00* (2006.01)
*H04W 84/12* (2009.01)

(52) U.S. Cl.
CPC ......... *H04W 28/065* (2013.01); *H04L 1/0003* (2013.01); *H04L 1/0059* (2013.01); *H04L 1/0071* (2013.01); *H04W 84/12* (2013.01)

(58) Field of Classification Search
CPC .. H04W 28/065; H04W 84/12; H04L 1/0003; H04L 1/0059; H04L 1/0071;
(Continued)

(56) References Cited

U.S. PATENT DOCUMENTS

2016/0301500 A1   10/2016   Suh et al.
2019/0356410 A1*   11/2019   Alpert ................. H04W 52/367
(Continued)

FOREIGN PATENT DOCUMENTS

CN    102761986 A    10/2012
CN    104604171 A    5/2015
(Continued)

OTHER PUBLICATIONS

Junghoon Suh et al, LPI PPDU Format, IEEE 802.11-20/1347r0, 11 pages. Aug. 2020.
(Continued)

*Primary Examiner* — Gary Mui
*Assistant Examiner* — Yewon Kim (57) ABSTRACT

Methods and apparatuses for encoding and decoding a physical layer (PHY) protocol data unit (PPDU) for low power indoor (LPI) wireless communication, which includes a preamble portion and a payload portion. The preamble portion includes a first universal signal field (U-SIG), the first U-SIG comprising information regarding a payload portion of the PPDU. The preamble portion further includes a second U-SIG, which contains identical information regarding the payload portion of the PPDU. The repetition of the U-SIG may improve robustness of the preamble portion detection and also enable auto-detection of the PPDU for LPI communication.

18 Claims, 8 Drawing Sheets

(58) Field of Classification Search
CPC ... H04L 1/0072; H04L 1/0009; H04L 1/0068; H04L 1/0041; H04L 1/08; Y02D 30/70
See application file for complete search history.

(56) References Cited

U.S. PATENT DOCUMENTS

| | | | |
|---|---|---|---|
| 2020/0136884 A1 | 4/2020 | Park et al. | |
| 2020/0177425 A1 | 6/2020 | Chen et al. | |
| 2021/0266098 A1* | 8/2021 | Cao | H04L 1/0643 |
| 2021/0297297 A1* | 9/2021 | Lim | H04L 27/22 |
| 2021/0367886 A1* | 11/2021 | Chen | H04L 45/74 |
| 2022/0045889 A1* | 2/2022 | Yu | H04W 72/0453 |
| 2023/0283421 A1* | 9/2023 | Lim | H04L 1/1893 370/338 |

FOREIGN PATENT DOCUMENTS

| | | |
|---|---|---|
| EP | 4175209 A1 | 5/2023 |
| WO | 2015061729 A1 | 4/2015 |
| WO | 2019235861 A1 | 12/2019 |

OTHER PUBLICATIONS

Ron Porat, "6GHz LPI Range Extension" 11-20/965r3, IEEE TGbe Jul. 2020.

Jianhan Liu, et. al., "DCM for range extension in 6GHz LPI", 11-20/986r1, IEEE TGbe Mar. 2020.

Jianhan Liu, et al., "On Modulation of MCS0 DCM and DCM Capability", 11-16/655r1, IEEE TGax May 2016.

Dongguk Lim (LGE): "11 be PPDU format",I E E E D Raft; 11-20-0019-04-00 B E-11 BE-PPDU-Format, IEEE-SA Mentor, Piscataway, NJ USA,vol. 802.11 EHT; 802.11 be, No. 4 May 11, 2020 (May 11, 2020) pp. 1-16, XP068167843.

Dongguk Lim (LGE): "Frame format for 11 bd",IEEE Draft; 11-19-1484-03-OOBD-FRAME-FORMAT-FOR-11 BD, IEEE-SA Mentor, Piscataway, NJ USA,vol. 802.11 NGV;802.11 bd, No. 3 Sep. 19, 2019 (Sep. 19, 2019), pp. 1-21 XP068154002.

LAN/MAN Standards Committee of the IEEEComputer Society: IEEE Draft; Draft P802.11AX_D4.2, IEEE-SA, Piscatawaynj USA,vol. 802.11 ax drafts, No. D4.2 Jun. 17, 2019 (Jun. 17, 2019), pp. 1-766, XP068150637.

Jianhan Liu (Mediatek Inc):"Zero User RUs for Per-80MHzResource Unit Allocation Signaling", IEEE Draft; 11-20-1102-01-OOBE-ZERO-USER-RUS-FOR-PER-80MHZ-RESOURCE-UNIT-ALLOCATION-SIGNALING, IEEE-SA Mentor, Piscataway, NJ USA,vol. 802.11 EHT; 802.11 be, No. 1 Jul. 23, 2020 (Jul. 23, 2020), pp. 1-8, XP068172902.

* cited by examiner

LOW POWER INDOOR FRAME FORMAT

RELATED APPLICATIONS

The present application claims the benefit of and priority to U.S. Provisional Patent Application No. 63/069,556 filed Aug. 24, 2020, entitled LOW POWER INDOOR FRAME FORMAT, the contents of which are incorporated herein by reference.

FIELD

The present disclosure relates to methods and systems for wireless network communications, and, more particularly, Low Power Indoor (LPI) frame format.

BACKGROUND

The Institute of Electrical and Electronics Engineers (IEEE) 802.11 is a group of media access control (MAC) and physical layer (PHY) specification standards for implementing wireless local area network (WLAN) communication in the Wi-Fi frequency bands. The 802.11 standards have experienced steady development and are projected for continued growth to meet the ever increasing demand for enhanced throughput, reduced latency and jitter, higher reliability, and improved power efficiency driven by new and emerging applications including virtual or augmented reality, immersive gaming, remote office and cloud computing.

A new protocol, IEEE 802.11be, is currently under development by the IEEE 802.11 Task Group TGbe, and will be the next major IEEE 802.11 amendment to define the next generation of Wi-Fi after IEEE 802.11ax (IEEE Std 802.11ax-2021). IEEE 802.11be (also called Extremely High Throughput (EHT)) is expected to support a data rate of at least 30 Gbps and may use a spectrum bandwidth up to 320 MHz for unlicensed operations, double the 160 MHz maximum bandwidth currently contemplated by IEEE 802.11ax. The improved capabilities of the 802.11be may at least in part be attributed to the release of the 6 GHz frequency band for unlicensed use.

Enabling low-power indoor (LPI) devices to operate across the entire 6 GHz band is fundamental to the success of the 6 GHz proceeding. Because of their low power and their indoor operation, these devices do not require Automated Frequency Coordination (AFC) and can operate in all four sub-bands while protecting licensed operations.

However, the Effective Isotropically Radiated Power (EIRP) Power Spectral Density (PSD) requirements for LPI APs and STAs in the 6 GHz frequency band are far more stringent than those in the 2.4 GHz and 5 GHz frequency bands. For example, the LPI APs in the 6 GHz band is permitted a maximum EIRP PSD of 5 dBm/MHz compared to the 17 dBm/MHz in the 5 GHz band; and LPI STAs are permitted a maximum of EIRP PSD of −1 dBm/MHz in the 6 GHz band compared to the 11 dBm/MHz in the 5 GHz band. Accordingly, LPI APs and STAs in the 6 GHz band have a much shorter range (i.e. approximately a quarter) and small coverage area (e.g. approximately 1/16) than their counterparts in the 5 GHz band.

In response, a new wide bandwidth (BW) LPI long range (LR) PPDU is proposed to ameliorate the above range and coverage issues. Specifically, a duplication (DUP) mode configured to extend the transmission range of the LPI Wi-Fi system in the 6 GHz frequency band by strengthening reliable detection of payload portion of a LPI frame as described in more detail below has been proposed. However, the proposed DUP mode is only defined for the payload portion of the LPI frame, and the preamble portion, where important control signals are transmitted, remains unchanged. Thus, arises the issue of the preamble portion being less reliable than the detection of the payload portion, which, in certain instances, despite the payload being detectable, the transmission frame may fail due to the failure of the preamble portion. Further, the LPI frame indicator is coded into the preamble and may need to be combined by the receiver to recognize an incoming LPI frame without the possibility of auto-detection.

Accordingly, it is desirable to provide a LPI frame format that may provide a preamble that is equally or more robust than payload portion of the LPI frame and may allow auto-detection of a LPI frame.

SUMMARY

Example embodiments of the present disclosure provide a LPI frame format having a preamble having greater robustness than that of the payload, and capable of enabling auto-detection of the LPI frame by the receiver.

In some aspects, the present disclosure describes a method of encoding a physical layer (PHY) protocol data unit (PPDU) for low power indoor (LPI) wireless communication, the method comprising: encoding a preamble portion of the PPDU, wherein the encoding further comprises: encoding a first universal signal field (U-SIG), the first U-SIG comprising one or more information bits regarding a payload portion of the PPDU; encoding at least a second U-SIG, the second U-SIG includes identical one or more information bits regarding the payload portion of the PPDU.

In any of the aspects above, the encoding of the first U-SIG may be followed by the encoding of the second U-SIG.

Any of the above aspects may further comprise encoding a plurality of U-SIGs in addition to the first and second U-SIG, wherein each of the plurality of U-SIG includes identical one or more information bits regarding the payload portion of the PPDU.

Any of the above aspects may further comprise applying a Dual sub-Carrier Modulation (DCM) to the second U-SIG.

Any of the above aspects may further comprise applying a bitwise interleaver scheme to the second U-SIG.

In any of the above aspects, the first U-SIG and the second U-SIG may be encoded with a modulation and coding scheme (MCS) having a code rate greater than one half, the method further comprising: adopting a first binary convolution code (BCC) puncturing pattern for the first U-SIG; and adopting a second BCC puncturing pattern for the second U-SIG, wherein the second BCC puncturing pattern is different from the first BCC puncturing pattern.

In any of the above aspects, the LPI wireless communication may be defined for an extended range mode of operation.

In any of the above aspects, the extended range mode of operation may be defined for a MCS scheme of MCS0 using a single spatial stream in non-punctured channels having one of 80 MHz, 160 MHz and 320 MHz bandwidth intended for a single station (STA).

In some further aspects, the present disclosure describes an apparatus of an access point (AP), the apparatus comprising non-transitory memory storage unit, and a processing unit operably coupled to the non-transitory memory storage unit, the processing unit is configured to: encode a preamble portion of the PPDU for low power indoor (LPI) wireless communication, wherein the preamble portion of the PPDU comprises: a first universal signal field (U-SIG), the first U-SIG comprising one or more information bits regarding a payload portion of the PPDU; at least a second U-SIG, the second U-SIG includes identical one or more information bits regarding the payload portion of the PPDU; and transmit the encoded PPDU.

In any of the above apparatus aspects, the preamble portion may further comprise a plurality of U-SIGs in addition to the first and second U-SIG, wherein each of the plurality of U-SIG includes identical one or more information bits regarding the payload portion of the PPDU.

In any of the above apparatus aspects, the second U-SIG may be applied, by the processing unit, a DCM scheme.

In any of the above apparatus aspects, the second U-SIG may be applied, by the processing unit, a bitwise interleaver scheme.

In any of the above apparatus aspects, the first U-SIG and the second U-SIG may be encoded with a modulation and coding scheme (MCS) having a code rate greater than one half, wherein a first binary convolution code (BCC) puncturing pattern is applied, by the processing unit, to the first U-SIG; and a second BCC puncturing pattern is applied, by the processing unit, to the second U-SIG, wherein the second BCC puncturing pattern is different from the first BCC puncturing pattern.

In some further still aspects, the present disclosure describes an apparatus of a station (STA), the apparatus comprising non-transitory memory storage unit, and a processing unit operably coupled to the non-transitory memory storage unit, the processing unit is configured to: receive a preamble portion of the PPDU, wherein detection further comprises: detect a first universal signal field (U-SIG) in the preamble portion of the PPDU, the first U-SIG comprising one or more information bits regarding a payload portion of the PPDU; detect at least a second U-SIG, the second U-SIG includes identical one or more information bits regarding the payload portion of the PPDU; combine the first and second U-SIG; and decode the preamble portion of the PPDU based on the combined first and second U-SIG.

In any of the above apparatus aspects, prior to combining the first and the second U-SIG, the processing unit may be configured to: perform a correlation check between the first and the second U-SIG; and upon a positive correlation, automatically determining the PPDU is configured for low power indoor (LPI) wireless communication.

In any of the above apparatus aspects, the automatic determining of the PPDU may further include automatically determining a MCS scheme of MCS0 using a single spatial stream in non-punctured channels having one of 80 MHz, 160 MHz and 320 MHz bandwidth intended for a single station (STA).

In any of the above apparatus aspects, the preamble portion may further comprise a plurality of U-SIGs in addition to the first and second U-SIG, the processing is further configured to: combine the plurality of U-SIGs with the first and the second U-SIG to improve robustness of the preamble portion detection.

In any of the above apparatus aspects, the processing unit may be further configured to decode the second U-SIG applied with a DCM scheme.

In any of the above apparatus aspects, the first U-SIG and the second U-SIG in the received preamble portion of the PPDU may be encoded with a modulation and coding scheme (MCS) having a code rate greater than one half, the processing unit is further configured to detect the first U-SIG having a first binary convolution code (BCC) puncturing pattern; and detect the second U-SIG having a second BCC puncturing pattern, wherein the second BCC puncturing pattern is different from the first BCC puncturing pattern.

In some further still aspects, the present disclosure describes a method of encoding a physical layer (PHY) protocol data unit (PPDU) for low power indoor (LPI) wireless communication, the method comprising: encoding a preamble portion of the PPDU, wherein the encoding further comprises: encoding a first universal signal field (U-SIG), the first U-SIG comprising one or more information bits regarding a payload portion of the PPDU without a Extremely High Throughput (EHT) signal field (SIG) in the preamble portion.

BRIEF DESCRIPTION OF THE DRAWINGS

Reference will now be made, by way of example, to the accompanying drawings which show example embodiments of the present application, and in which.

DESCRIPTION OF EXAMPLE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

The following is a partial list of acronyms and associated definitions that may be used in the following description:
DUP Duplication
LPI Low Power Indoor
U-SIG Universal SIG Field
EHT Enhanced High Throughput
MCS Modulation and Coding Scheme
DCM Dual Subcarrier Modulation
PPDU PLCP Protocol Data Unit
PLCP PHY Convergence Protocol
BW Bandwidth A suitable LPI frame format is described herein for improving the robustness of the preamble of LPI frames to be equal to or greater than that of the payload portion. The present description also describes example embodiments of a LPI frame format that may permit auto-detection of an incoming LPI frame by the receiver. Example embodiments described herein may be implemented using IEEE 802.11 technology.

Figure 1:
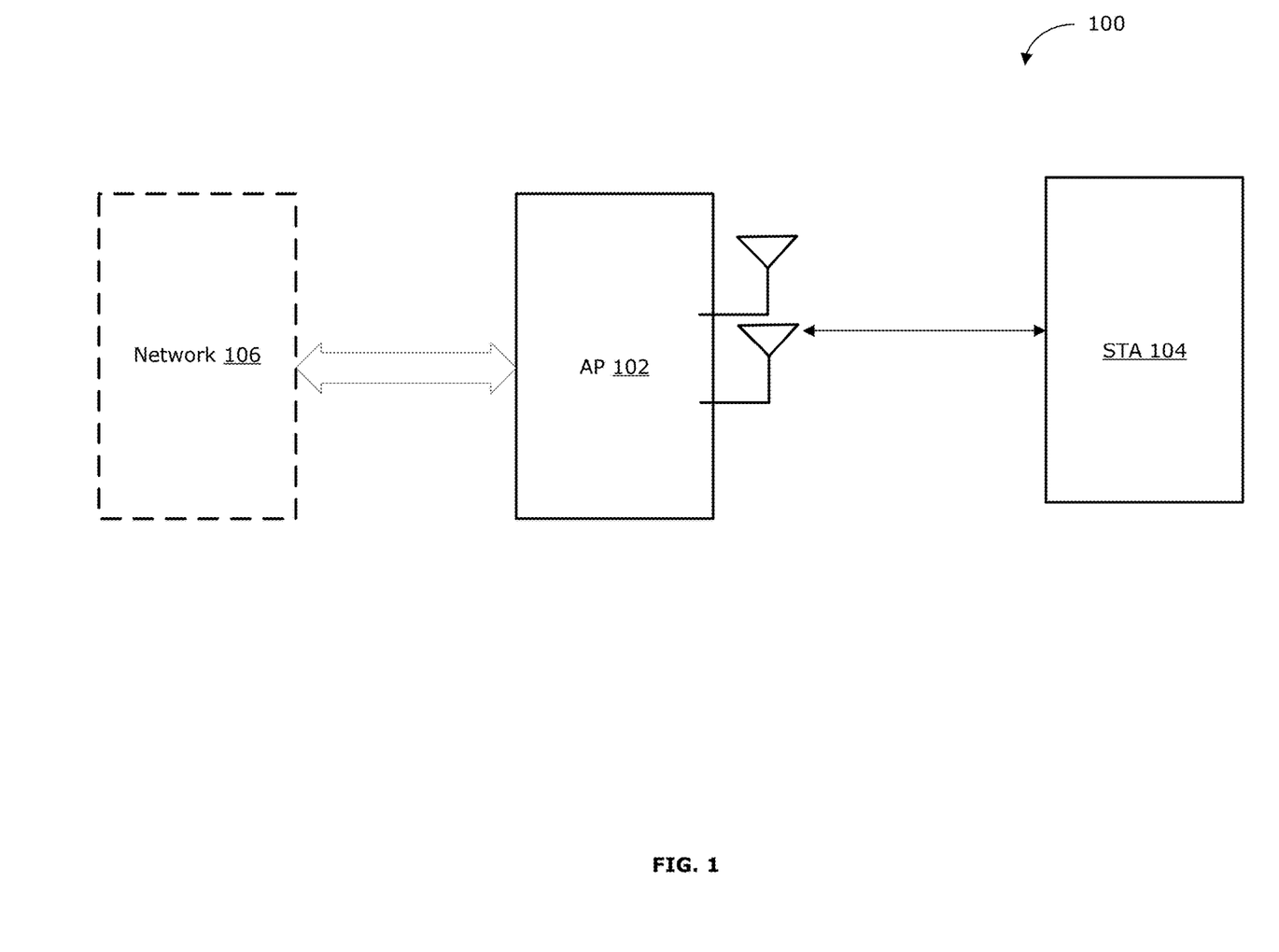
FIG. 1 illustrates a wireless network that includes a plurality of wireless communication apparatuses configured to transmit and receive wireless signals according to example embodiments.

FIG. 1 shows a wireless network 100 that includes a plurality of wireless communication apparatuses configured to transmit and receive wireless signals according to example embodiments. The wireless network 100 may be a Wireless Local Area Network (WLAN) although embodiments are not limited as such.

The wireless communication devices include an access point (AP) 102 and a station (STA) 104. In some embodiments, AP 102 and STA 104 may be configured to transmit and receive signals within wireless network 100 in accordance with specific communication standards and/or protocols, such as any of the Institute of Electrical and Electronics Engineers (IEEE) 802.11 standards including, IEEE 802.11n, IEEE 802.11ac, IEEE 802.11ax and/or proposed specifications for WLANs such as IEEE 802.11be. Communication within wireless network 100 may also be suitable to transmit and/or receive communications in accordance with other techniques and standards, including Long-Term Evolution (LTE) standard as promulgated by the Third Generation Partnership Project (3GPP). In further examples, a wireless standard can include a Fifth Generation (5G) wireless standard.

In some examples, the wireless network 100 may be configured for Very High Throughput (VHT) communications in accordance with the IEEE 802.11ac standard (referred to as the 11ac standard hereinafter), High Efficiency (HE) communications in accordance with the IEEE 802.11ax standard (referred to as the 11ax standard hereinafter), or Extremely High Throughput (EHT) in accordance with the proposed IEEE 802.11be standard (referred to as the 11be standard hereinafter), or any other suitable wireless communication standards between the AP 102 and the STA 104. The wireless network work 100 may be configured to employ orthogonal frequency-division multiple access (OFDMA) techniques.

The STA 104 may be associated with the AP 102 through a registration procedure. Upon being associated, AP 102 is able to communicate with STA 104 in the wireless network 100. In some embodiments, STA 104 may be a LPI device that functions primarily indoors where signal transmissions may be subjected to attenuation from indoor structures such as walls. The STA 104 may be any LPI electronic devices used primarily in indoor settings. For example, STA 104 may include any of the following: a desktop computer, a notebook computer, a tablet computer, a smartphone, an Internet-of-Things (IoT) device (e.g., a sensor, a camera, a thermostat, a household appliance, etc.), a wearable device (e.g., a smartwatch, smart eyeglasses, a head-mounted device, etc.), server computers, storage devices, and so forth.

In example embodiments, AP 102 is configured to function as an interface the STA 104 and a network 106 where AP 102 may forward requests to the network 106 via a bi-directional communication link and pass responses received from network 106 onto STA 104 through a bi-directional wireless channel. For embodiments where the STA 104 is a LPI device, the wireless communication between the AP 102 and the STA 104 may be subject to attenuation due to indoor structural elements, such as walls.

It is to be understood that although a single instance of each AP 102, STA 104, and network 106 is shown, there may be embodiments where multiple instances of each component are present within wireless network 100.

Figure 2:
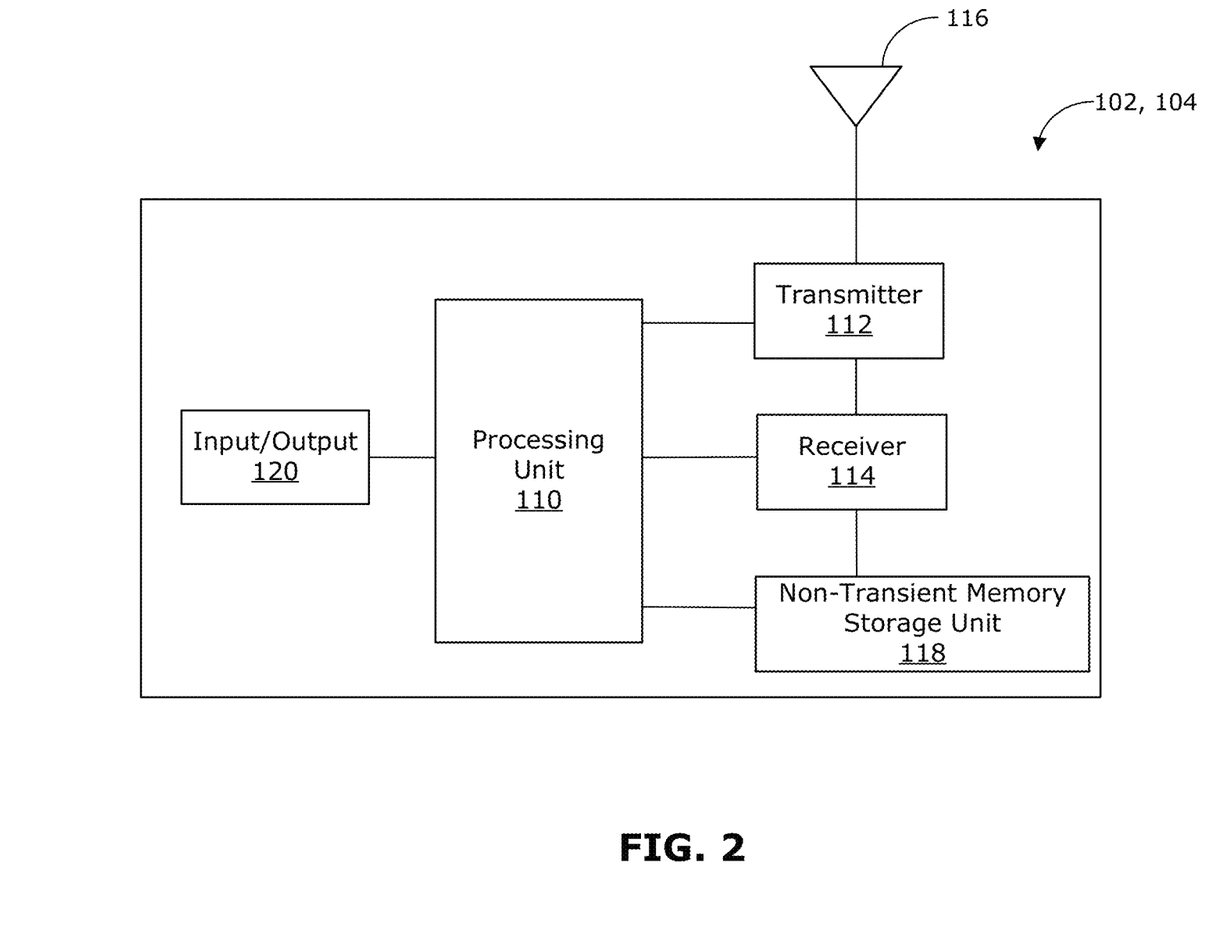
FIG. 2 illustrates an example wireless communication apparatus that may act as an AP 102 or a STA 104 shown in FIG. 1.

FIG. 2 shows an example wireless communication apparatus that may act as an AP 102 or a STA 104 shown in FIG. 1. The wireless communication apparatus includes at least one processing unit 110, at least one transmitter 112, at least one receiver 114, one or more antennas 116, at least one non-transitory memory storage unit 118, and one or more input/output devices or interfaces 120.

The processing unit 110 implements various processing operations of AP 102 or the receiving STA 104, such as signal coding, data processing, power control, input/output processing, or any other functionality. The processing unit 110 can also be configured to implement some or all of the functionality and/or embodiments described herein. Each processing unit 110 includes any suitable processing or computing device configured to perform one or more operations. Each processing unit 110 can, for example, include a microprocessor, microcontroller, digital signal processor, field programmable gate array, or application specific integrated circuit. The processing unit 110, being operably connected to the input 120, transmitter 112 and receiver 114, may be configured to generate wireless signals based on signals received from input 120 for transmission by the transmitter 112 or to process wireless signals received from receiver 114. In some embodiments that communicate OFDM signals or OFDMA signals, the processing unit 110 may be configured to generate OFDM or OFDMA signals that are suitable for transmission by, for example, performing an inverse fast Fourier transform (IFFT) or any other suitable processing technique. The processing unit 110 may also be configured to process received OFDM signals or OFDMA signals by, for example, performing a Fast Fourier Transform (FFT) or any other suitable processing technique. In some embodiments, the processing unit 110 may be configured to detect the presence of an OFDM signal or OFDMA signal by performing a correlation or cross-correlation, to detect a preamble. The preambles may be part of a predetermined frame structure for Wi-Fi communication. Although a single instance of a processing unit 110 is shown, it is to be understood that multiple instances of the processing unit 110 may be present in each wireless communication apparatus. For example, there may be at least one processing unit for processing output signals to be transmitted by the transmitter 112 and at least one processing unit for processing input signals from the receiver 114.

Transmitter 112 may include any suitable structure for generating signals for wireless or wired transmission. Each receiver 114 may include any suitable structure for processing signals received wirelessly or by wire. Each transmitter 112 and receiver 114 can include associated amplification and modulation/demodulation circuitry. Although shown as separate components, at least one transmitter 112 and at least one receiver 114 may be combined into a single transceiver. Each antenna 116 may include any suitable structure for transmitting and/or receiving wireless or wired signals. Although a common antenna 116 is shown here as being coupled to both the transmitter 112 and the receiver 114, one or more antennas 116 could be coupled to one or more transmitter(s) 112, and one or more separate antennas 116 could be coupled to one or more receiver(s) 114. In some examples, one or more antennas 116 may be an antenna array, which may be used for beamforming and beam steering operations. Each non-transitory memory storage unit 118 may include any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. The non-transitory memory storage unit 118 may store instructions and data used, generated, or collected by AP 102 or STA 104. For example, the non-transitory memory storage unit 118 could store software instructions or modules configured to implement some or all of the functionality and/or embodiments described herein and that are executed by the processing unit(s) 110.

The input/output device/interface 120 may permit interaction with a user or other devices in the network. The input/output device/interface 120 includes any suitable structure for providing information to or receiving/providing information from a user, including network interface communications.

In some embodiments, the AP 102 and STA 104 may be configured to communicate over various wireless channel bandwidths including bandwidths having center frequencies of about 2.4 GHz, 5 GHz, 6 GHz, and bandwidths of 20 MHz, 40 MHz, or 80 MHz, 80+80 MHz, 160 MHz, 160+160 MHz, 320 MHz, 320+320 MHz, 480 MHz (such as 160+160+160 MHz), 640 MHz bandwidths. In some embodiments, the bandwidth of a channel less than 20 MHz may be used. According to some wireless standards, such as the 11ax standard, an OFDMA channel is subdivided into multiple resource units (RUs), where each RU consists of a group of contiguous subcarriers defined in the frequency domain. In the 11ax standard, RUs are defined based on RU sizes such as 26-tone RU, 52-tone RU, 106-tone RU, 242-tone RU, 484-tone RU, 996-tone RU and 2×996-tone RU. Although reference is made to 11ax, it is noted that techniques or mechanisms according to some implementations of the present disclosure can be used in conjunction with other standards, including future generations of the IEEE 802.11 standards or different standards. The different RUs of an OFDMA channel may include subcarriers of different frequencies. Each RU is a sub-channel of the OFDMA channel. Different RUs can be assigned to different STAs within a Physical Layer Convergence Procedure (PLCP) Protocol Data Unit (PPDU). Each RU is used for one OFDM symbol for one STA. In the allocated RU, the MCS for each station is same across all the OFDM symbols (i.e., a single MCS is used for each station) within one PPDU. The MCSs used for RUs for different stations can be different within one PPDU.

In the wireless network 100, the wireless communication apparatuses, such as AP 102 and STA 104, communicate with one another through various well-defined frames structures. The frame structures, such as a PPDU, may be generated by the processing unit 110 of the wireless communication apparatus shown in FIG. 2. In some embodiments, a frame structure may be configurable to have the same bandwidth as a channel. The frame structure may be in the form of a PPDU which may include a frame preamble portion, and a payload portion. In some embodiments, there may be different types of PPDUs that may have different fields and different PHY layers and/or different MAC layers. For example, a single user (SU) PPDU, multiple-user (MU) PPDU, LPI PPDU, long-range (LR) SU PPDU, trigger-based (TB) PPDU.

Figure 3:
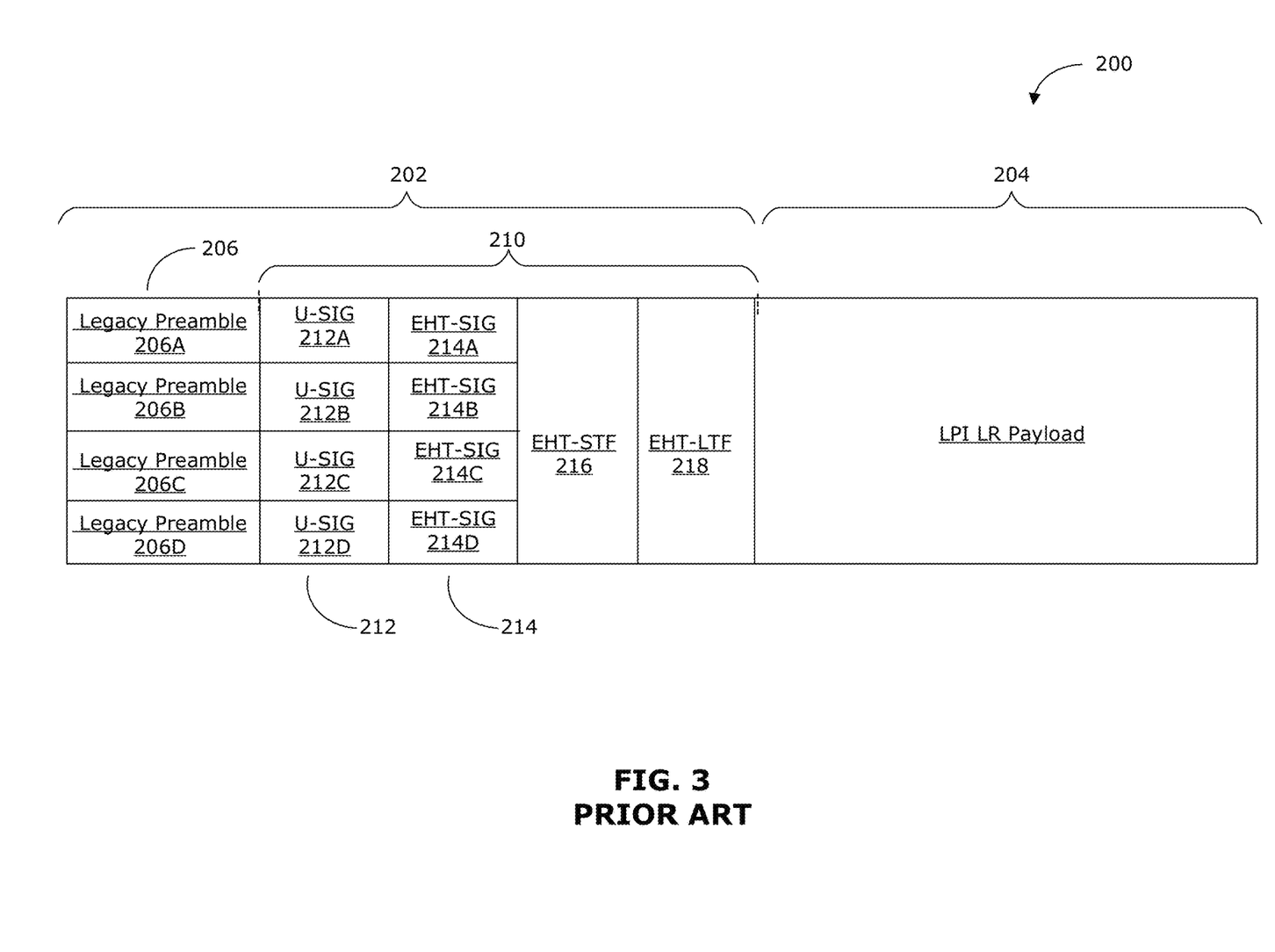
FIG. 3 illustrates an example of a prior art EHT PPDU frame that may be used for wide BW LPI LR communication in an 80 MHz channel.

In the 11be standard, a wide BW LPI LR PPDU (referred to as the LPI PPDU hereinafter) for operation in the 6 GHz band has been proposed to, at least in part, address the short range and decreased coverage area imposed on LPI devices by the proposed EIRP PSD requirements. Here, wide BW may be defined as having a BW equal to or greater than 80 MHz. FIG. 3 illustrates an example of a proposed EHT PPDU frame 200 that may be used for wide BW LPI LR communication in an 80 MHz channel. The EHT PPDU frame 200 may be generated and transmitted by a processor 110 of a transmitter, and received and decoded by a processor 110 of a receiver. The EHT PPDU frame 200 may include a preamble portion 202 followed by a payload portion 204.

As shown, the preamble portion 202 may include a legacy preamble portion 206 and an EHT preamble portion 210. The legacy preamble portion 206, which was first established in the IEEE 802.11a standard (referred to as the 11a standard hereinafter), may permit backward-compatibility and coexistence with legacy IEEE 802.11 devices. The legacy preamble portion 206 may include two ODFM symbols carrying a legacy short training field (L-STF) (not shown) and a legacy long training field (L-LTF) (not shown) configured for frame detection and receiver synchronization, respectively. The next OFDM symbol of the legacy preamble portion 206 may carry a legacy signal field (L-SIG) (not shown) that may indicate which MCS is used for subsequent signal and the associated frame length. The L-SIG symbol is then repeated as RL-SIG (not shown), which may or may not have a reversed polarity as the L-SIG. The RL-SIG may be used to support the coverage extension such as 11ax, and may permit reliable transmission when small RU size is used for transmission. The legacy preamble portion 206 may be decoded by legacy Wi-Fi devices. For 802.11 standards after 11n, the MCS and frame length indicated in L-SIG may be token placeholders. The real values of MCS, frame size, and other parameters may be transmitted by other symbols according to a particular version. By way of an example, in 11ax, first, it repeats L-SIG as RL-SIG and indicates the length equal to one or two modulo three. Second, its High Efficiency (HE) signal field contains two OFDM symbols. The first one is modulated with QBPSK, while the second one is modulated with either BPSK or QBPSK. The result of the modulo operation combined with BPSK/QBPSK selection identifies one of the four 11ax frame types.

In the illustrated embodiment, the EHT preamble portion 210 includes U-SIG field 212, EHT-SIG field 214, EHT-STF field 216, and EHT-LTF field 218.

In some embodiments, the frame formats of the 11be standard and beyond use a two-OFDM-symbol long universal SIG (U-SIG) 212, which may comprise of information bits regarding the payload portion 204. The adoption of the U-SIG 212 may provide forward compatibility with future IEEE 802.11 standards. As it may be appreciated, being two symbols long, the U-SIG 212 may possess a maximum bit carrying capacity of 42 bits. The U-SIG 212 is similar to the HE-SIG-A in the 11ax PPDU in that it may contain version-independent information followed by version dependent information. The version independent information may include a three-bit PHY format identifier, one-bit UL/DL flag, Basic Service Set (BSS) color of at least 6 bits, transmission (TX) opportunity (TXOP) duration of at least 7 bits, bandwidth etc. The version dependent information may include the number of EHT long training fields symbols, mid-amble periodicity, and space-time block coding flag among other information. The U-SIG 212 may be further encoded with separate error detection code (i.e. cyclic redundancy check (CRC) code of at least 4 bits) and 6 tail bits. Further, the presence of the U-SIG 204, together with other symbols, such as L-SIG, may allow the receiver to differentiate between an 11be frame and an 11ax frame. For example, for 11be EHT transmission, the L_LENGTH field in L-SIG may be set such that L_LENGTH modulo 3 is equal to 1 and the bit B0 of U-SIG 212 may be set to 0 which the receiver may recognize as an EHT PPDU. In some embodiments, the U-SIG 212 may be encoded with MCS0 at a code rate of R=1/2, interleaved, and mapped to a binary phase shift keying (BPSK) constellation.

In some example embodiments, the EHT-SIG field 214 may store information in addition to those stored in the U-SIG field 212. The EHT-SIG field 214 may adopt its own MCS that is different from the data MCS and can occupy a variable number of ODFM symbols, which may be indicated in the U-SIG field 212. In example embodiments, The EHT-SIG field 214 may include a common field and a user-specific field. The common field may contain information about MCS, the number of spatial streams (NSS), coding, the duration of the guard interval, and RU allocation, etc. The user-specific fields may be present for multi-user (MU) frames and carry dedicated information for individual STAs. For example, the EHT-SIG field 214 may include subfields for each of the multiple STAs. Each STA subfield can include subfields that specify: STA-ID that uniquely identifies the target STA, the RUs assigned to the target STA, and the MCSs used for each of the respective RUs assigned to the target STA (e.g., MCS(i) for RU i; MCS(j) for RU j). In example embodiments, the MCS subfields can be populated with an MCS index value that maps to the specified MCS applied to the RU.

In some example embodiments, the EHT short training field (STF) 216 and EHT long training field (LTF) 218 may follow the EHT-SIG field 214 and, may serve define time and frequency tuning of MIMO/OFDMA. In some embodiments, EHT-STF 216 and EHT-LTF 218 are of the longer variants of STF and LTF from the 11ax standard, which may be enable extended range and better channel estimation. In some of the wide BW embodiments having channel BW of 80 MHz or greater, the EHT-STF field 216 and the EHT-LTF field 218 are repeated every 20 MHz as shown in FIG. 2. In some embodiments, the phase of every 20 MHz copy of the EHT-STF 216 and EHT-LTF 218 may be rotated to reduce the peak-to-average power ratio and enhance correlation performance.

In some example embodiments, when a wide bandwidth is used, the legacy preamble portion 206, the U-SIG field 212, and the EHT-SIG field 214 may be duplicated every 20 MHz. Thus, as shown, in an 80 MHz channel, the legacy preamble 202 is repeated four times into legacy preambles 206A, 206B, 206C, and 206D; U-SIG fields 212A, 212B, 212C, and 212D; as well as EHT-SIG fields 214A, 214B, 214C, and 214D.

The payload portion 204 may include one or more fields in the form of OFDM symbols containing Physical Layer Convergence Protocol (PLCP) Service Data Units (PSDU), which is the data unit sent down from the MAC layer for transmission on the wireless medium.

Figure 4:
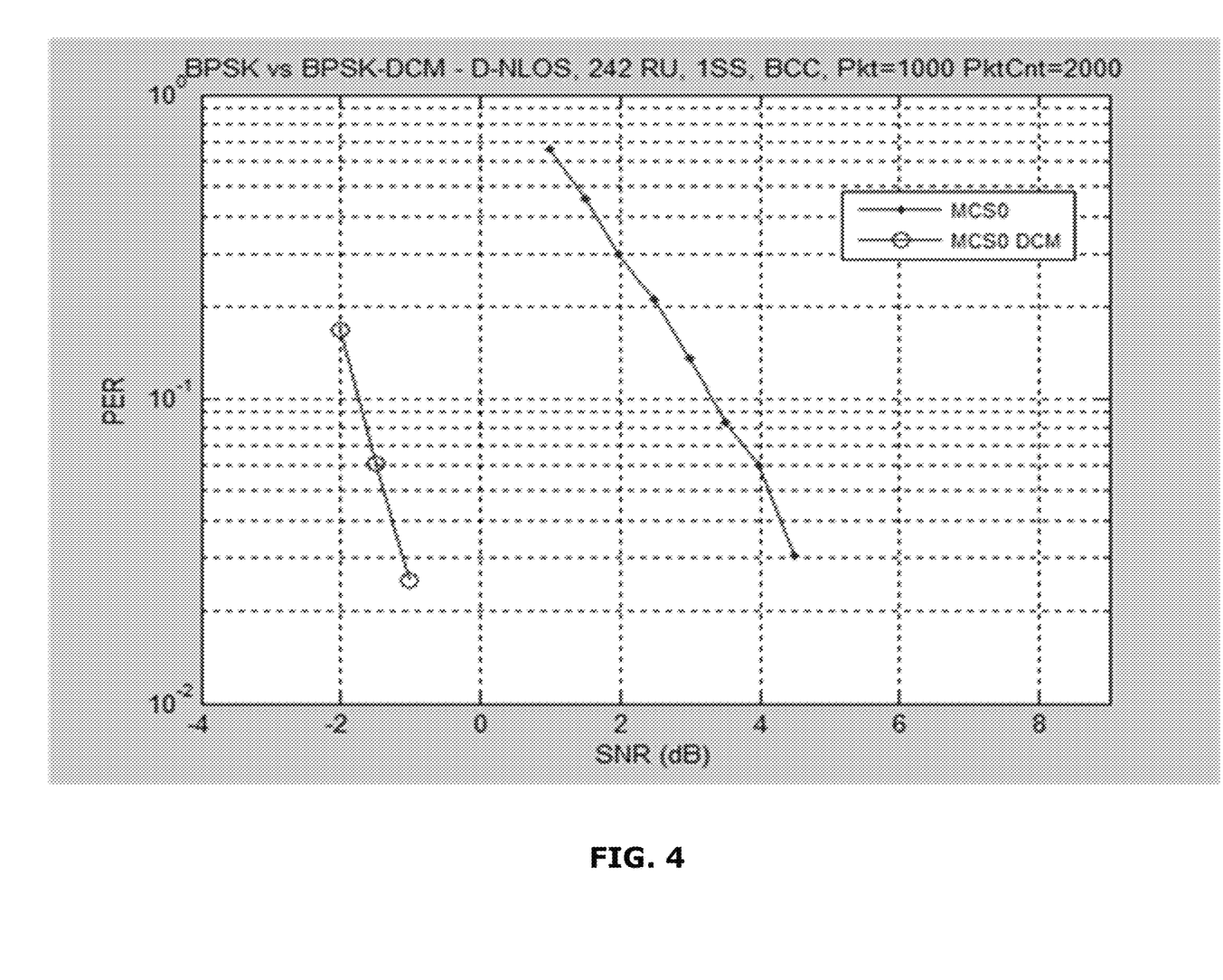
FIG. 4 illustrates a simulation plot showing improvement of MSC0 with DCM scheme applied.

The DUP mode that is designed to extend the range and coverage area of LPI devices is defined for non-punctured 80 MHz, 160 MHz and 320 MHz PPDUs transmitted to a single STA. In the DUP mode, one half of the payload portion 204 channel BW is duplicated in the other half of the BW. By way of examples, the upper 40 MHz of a payload portion 204 of a PPDU is duplicated into the lower 40 MHz in case of 80 MHz PPDU; or the upper 80 MHz is duplicated into the lower 80 MHz in case of 160 MHz PPDU; or the upper 160 MHz is duplicated into the lower 160 MHz in case of 320 MHz PPDU. The DUP mode is limited only to MCS0 using BPSK modulation scheme with a code rate of R=1/2, with Dual sub-Carrier Modulation (DCM) and to a single NSS. DCM introduces frequency diversity into OFDM to counteract the unreliability of coded information on a single tone in a channel with deep fade. Specifically, the DCM technique maps the same coded information onto two separate and different subcarriers separated in frequency with different mapping schemes. In some embodiments, the U-SIG field 212 may include an MCS sub-field indicating the MCS and a DCM indication bit indicating whether DCM is applied for the subsequent fields. If the DCM indication bit is zero, then the receiver calculates the logarithm likelihood ratio (LLR) of a received bit for each subcarrier based on the indicated MCS. On the other hand, if the DCM indication bit is equal to one, then the receiver calculates the LLR by performing LLR combining of the upper subcarrier and the lower subcarrier of the RU. In some embodiments, when DCM is applied, ODFM symbols of the payload portion 204 may be encoded by a binary convolution code (BCC) encoder. In some embodiments, the encoded data may be interleaved, and the interleaved bits may be repeated on two halves of a RU. The interleaved information bits may then be modulated and mapped constellation symbols, which are replicated or otherwise block coded. Upon receipt of the constellation symbols, they are mapped onto half of the subcarriers carrying half of the ODFM symbol. A phase-shifted constellation symbol is mapped to the other half of the subcarriers. Thus, the same ODFM symbol is effectively repeated twice by DCM in addition to the duplication in the time domain. As a result of the duplication of the payload portion 206, an improvement of 3 dB gain may be obtained. Further as a result of the MCS0 with DCM coding scheme, a further 5 dB gain improvement may be provided as shown in FIG. 4. Specifically, FIG. 4 shows a simulation plot of performance of BPSK MCS0 only and BPSK MSC0 with DCM on a Deep Non-Line-of-Sight (D-NLOS) channel having 242 RUs and 1 NSS with 2000 1000-byte data packets. The plot shows the Packet Error Rate (PER) on the y-axis as a function of the Signal Noise Ratio (SNR) on the x-axis. As may be observed, for similar PER, the MSC0 with DCM generally exhibits a better gain of approximately 5 dB. Together, the proposed DUP mode may provide up to 8 dB more gain for the payload portion 204, hence extending the range and coverage area of the LPI PPDU.

However, even if a receiver is capable of combining the repeated U-SIG fields 212 in the frequency domain, it is not guaranteed to keep more reliable detection than the payload. For example, in the embodiment show in FIG. 3, even if the four repeated U-SIG fields 212 may be combined, that would yield only a 6 dB gain, which is still lower than the 8 dB gain of the payload portion 206. Moreover, since the 11ax standard, the technique of preamble puncturing has been made available. Preamble puncturing allows non-primary 20 MHz channels to be zeroed out or not transmitted, hence "punctured", in transmissions where the bandwidth is 80 MHz or greater. Thus, in the illustrated embodiment shown in FIG. 3, of the four repeated fields 206 A-D, 212A-D, and 214A-D, the signals in one of the 20 MHz channels (i.e. 206B, 212B, and 214B) or two consecutive 20 MHz channels (i.e. 206B, 212B, 214B and 206C, 212C, and 214C), or two discontinuous 20 MHz channels (ie. 206B, 212B, 214B, and 206D, 212D, and 214D) may be punctured. In order to determine the preamble puncturing pattern the non-punctured U-SIG fields 212 need to be decoded. In such embodiments where one or more U-SIG fields 212A-D are punctured, 6 dB gain of the preamble portion 202 would not be realizable, which further degrades the robustness of the preamble portion 202. In some embodiments, an AP can identify a single user (SU) preamble puncture transmission, and can signal, such as through the version independent/dependent portion of the U-SIG field 212, that a resource unit (RU) size is assigned to a same user, or STA, to indicate the SU preamble puncture transmission. Since the payload is duplicated using the half of the PPDU BW onto the other half of the PPDU and the MCS of the payload for LPI frame is MCS0+DCM, the payload portion is still more reliable than the preamble portion.

Figure 5:
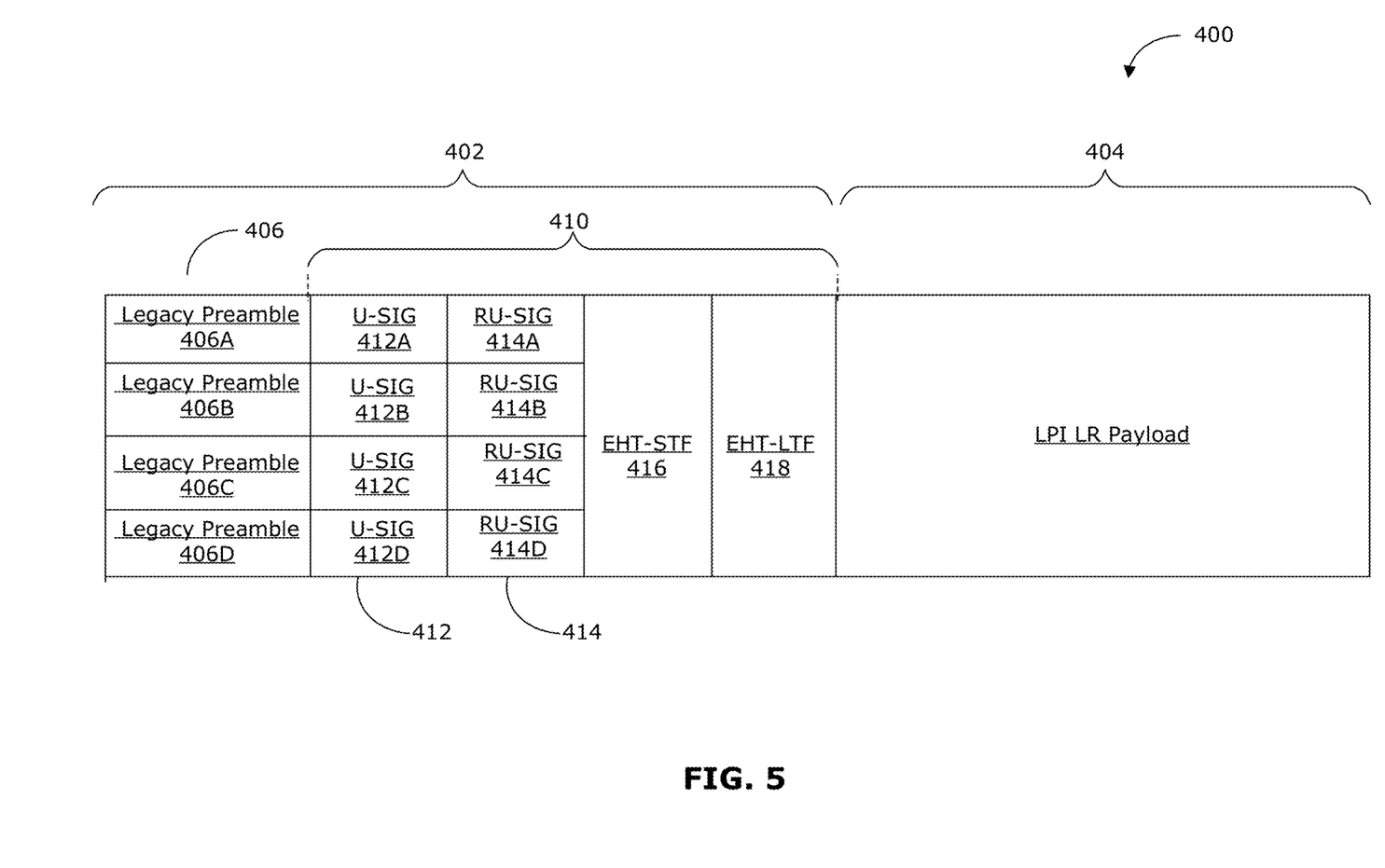
FIG. 5 illustrates an EHT LPI PPDU in accordance with embodiments of the present disclosure.

FIG. 5 illustrates an EHT LPI PPDU 400 in accordance with embodiments of the present disclosure that may be used for wide BW LPI LR communication. The EHT LPI PPDU 400 is shown to have an 80 MHz BW channel. However, it is to be understood that the description below may be extended to 160 MHz and 320 MHz BW channel mutatis mutandis.

In the illustrated embodiment, the EHT LPI PPDU 400 includes a preamble portion 402 and a payload portion 404. The preamble portion 402 includes legacy preamble 406 and EHT preamble 410.

In some embodiments, the legacy preamble 406 may be identical to the legacy preamble 206 configured for backward compatibility and coexistence with legacy IEEE 802.11 devices.

The EHT preamble 410 includes a first U-SIG field 412, a second or repeated U-SIG (RU-SIG) 414, EHT-STF 416, and EHT-LTF 418.

In some embodiments, the preamble portions including legacy preamble 406, the U-SIG field 412, and RU-SIG field 414 are repeated every 20 MHz in the frequency domain. Thus, in the illustrated embodiment having an 80 MHz BW channel, the fields 406, 412, and 414 are each repeated four times as 406A-D, 412A-D, and 414A-D, respectively. The EHT-STF 416, EHT-LTF 418, and payload portion 404 may take up the entire 80 MHz channel BW.

In the illustrated embodiment, the fields U-SIG 412, EHT-STF 416, EHT-LTF 418, and payload portion 404 are identical to the fields U-SIG 212, EHT-STF 416, EHT-LTF 418, and payload portion 404 and the description of which are not reproduced here for brevity.

In the EHT LPI PPDU 400, the EHT-SIG field from EHT LPI PPDU 200 is replaced with RU-SIG 414. This is made possible at least part due to the defined operating fields of the DUP mode LPI PPDU. Specifically, the DUP mode is defined for non-punctured preamble with MCS set to MCS0, the NSS is limited to 1, transmission is for a single STA or single user (SU) only. Accordingly, the EHT-SIG field, in which the common field is used to encode the MCS and the NSS, and the user specific field is used for MU communication may be rendered obsolete as a receiver, upon detection of an EHT LPI PPDU 400, may be capable of discerning the values of such control signals without the EHT-SIG. In some embodiment, the presence of the RU-SIG 414 may provide a preamble portion 402 that is more robust than that of the payload portion 404. The two time domain repetitions of the U-SIG field in the first U-SIG field 412 and the second RU-SIG field 414 may provide a 3 dB gain in the SNR of the preamble detection, and particularly the U-SIG field. In addition to the four frequency domain repetitions of the U-SIG field, which provides at least a 5 dB, or greater, gain in the SNR of the preamble detection, provides at least a 9 dB gain in the SNR of the preamble detection. Compared to the 8 dB gain of the payload portion 404 in DUP mode obtained from the duplication of the payload and the use of the DCM, the EHT LPI PPDU 400 provides a more robust preamble portion 402.

In some embodiments, the repetition of the first U-SIG 412 into the second RU-SIG 414 may permit auto-detection of the EHT LPI PPDU 400. In some embodiments, the first U-SIG field 412 is two OFDM symbol long, and correspondingly, the RU-SIG 414 is a two-OFDM-symbol long identical copy of the U-SIG 412. A processor 110 of a receiver may perform a correlation check between the U-SIG field 412 and the time domain delayed RU-SIG 414 as a function of the delay without decoding the U-SIG field. A high correlation output from a correlation function may indicate to the receiver that two U-SIG fields are present, which is indicative of an EHT LPI PPDU frame 400. The receiver may then be able to combine the frequency domain repeated U-SIG fields and also combine the U-SIG 412 and RU-SIG 414 in the time domain for the purpose of detection with increased robustness in terms of improved SNR gain.

Figure 6:
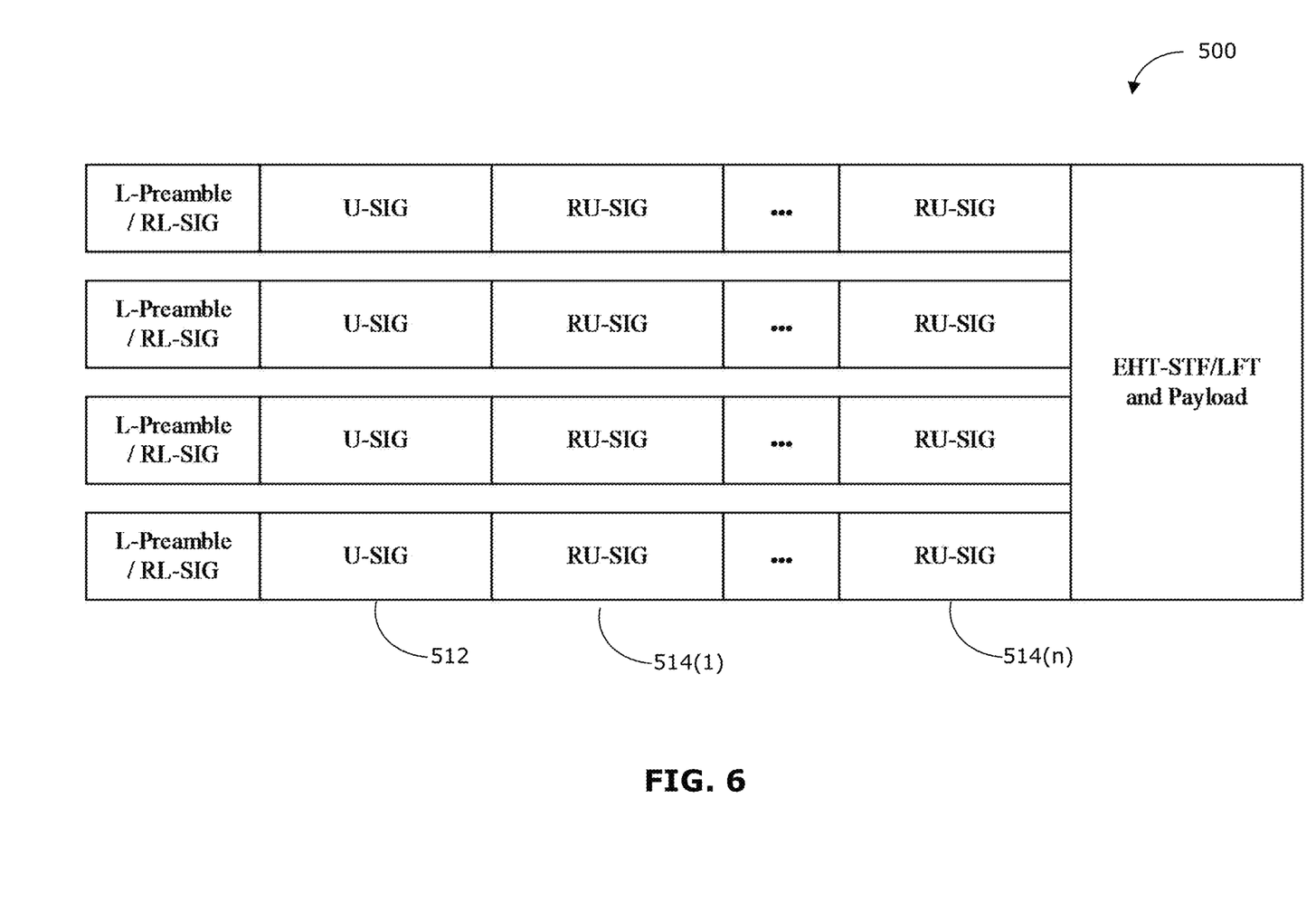
FIG. 6 illustrates a further embodiment of an EHT LPI PPDU in accordance with embodiments of the present disclosure.

FIG. 6 illustrate a further embodiment of an EHT LPI PPDU 500 in accordance with embodiments of the present disclosure that may be used for wide BW LPI LR communication. It should be noted that the EHT-STF, EHT-LTF, and payload portion are shown as a single block for clarity and brevity, and they are not intended to be one field.

The EHT LPI PPDU 500 is otherwise identical to EHT LPI PPDU 400, except that following the field U-SIG 512, instead of replacing the EHT-SIG with a single RU-SIG, EHT LPI PPDU 500 includes a plurality, (i.e. two or more) of the U-SIG 512 in RU-SIGs 514(1) ... 514(n), where n is a positive integer. In some embodiments, the U-SIG field 512 is identical to U-SIG 212, 412 described above. The increased time domain repetition of the U-SIG signal may provide additional gains in the SNR of the preamble portion detection expressed in dB may be calculated as:

$$\Delta SNR = 10 \log(n)$$

Accordingly, the overall improvement in SNR of the preamble detection for EHT LPI PPDU 500 may be 5 dB+$\Delta$SNR. For example, with two RU-SIGs, the gain improvement may be 5 dB+~5 dB of approximately 10 dB. Auto-detection of EHT LPI PPDU 500 may be possible by performing a correlation check between U-SIG 512 and the first RU-SIG 514(1) similar to that of EHT LPI PPDU 400 described above.

Figure 7:
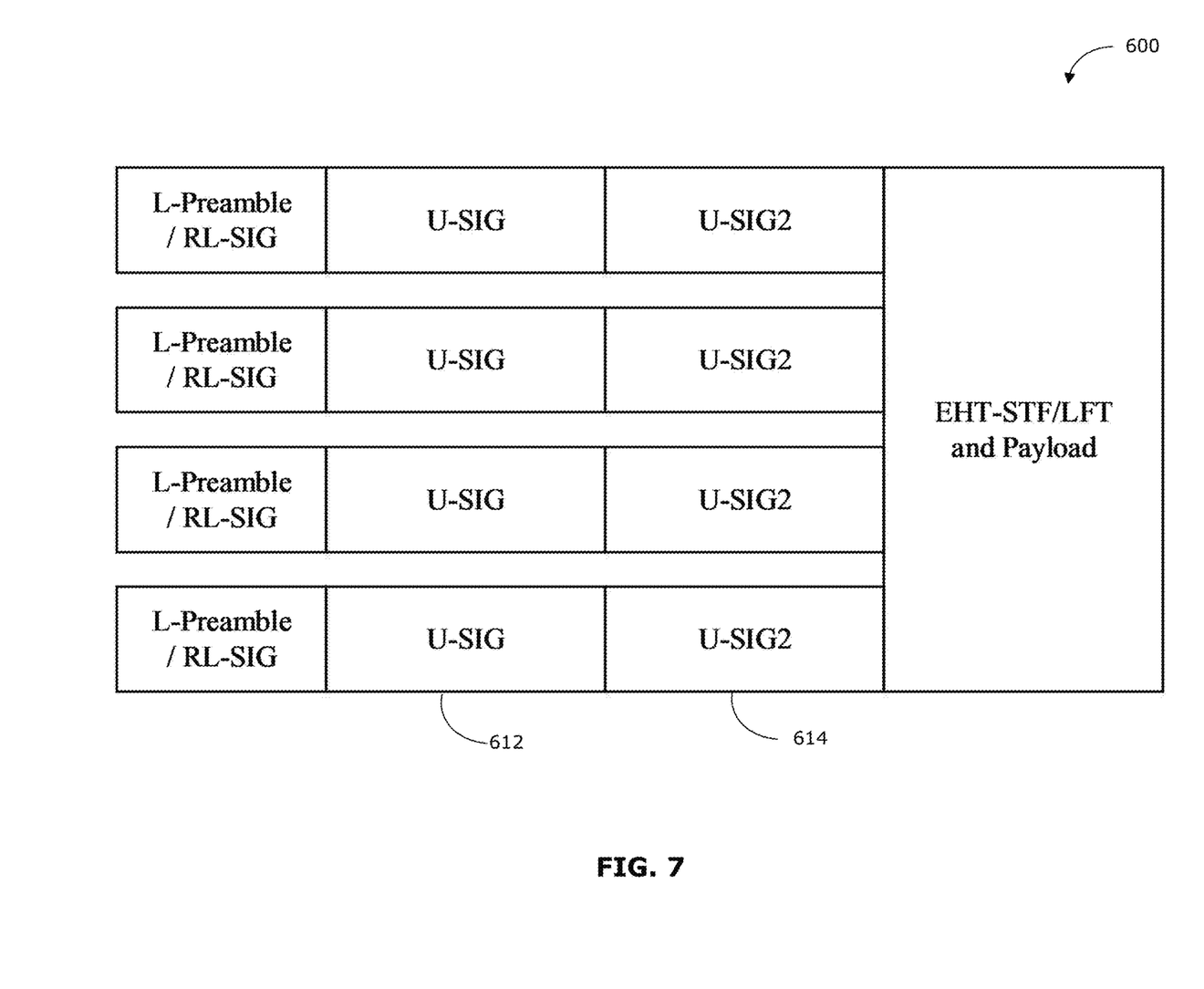
FIG. 7 illustrates a further still embodiment of an EHT LPI PPDU in accordance with embodiments of the present disclosure.

FIG. 7 illustrates a further still embodiment of an EHT LPI PPDU 600 in accordance with embodiments of the present disclosure that may be used for wide BW LPI LR communication. The EHT LPI PPDU 600 is otherwise identical to EHT LPI PPDU 400, except that it includes, among other fields, a first U-SIG 612 followed by a second U-SIG2 field 614. In some embodiments, the U-SIG field 612 is identical to U-SIG field 212 and 412 described above. The second U-SIG2 field 614 may carry identical content as that of U-SIG 612. In some embodiments, DCM scheme is applied to the U-SIG2, for example as described in the PCT/CN2020/106313, the contents of which is incorporated herein in its entirety. In some embodiment, the DCM scheme may be the same DCM scheme applied to the MCS 0/1/3/4 as set out in the 11ax standard where every subcarrier is applied with a phase shift. The DCM may be applied in combination with any suitable MCS, by way of a non-limiting example MCS0 with DCM as applied to the payload portions in the DUP mode. As may be appreciated, with DCM applied to the U-SIG2 614, it may provide added SNR improvement in U-SIG detection and hence making preamble detection more robust. Since the content of U-SIG2 614 is identical to that of U-SIG 612, auto-detection of the EHT LPI PPDU 600 may be possible by performing a correlation check between U-SIG 612 and U-SIG2 614 similar to that of EHT LPI PPDU 400 described above.

In some embodiments, U-SIG2 614 may adopt a BCC puncturing pattern that is different from that of U-SIG 612. In particular, in embodiments where a EHT LPI PPDU frame that is defined for with a MCS having a code rate higher than the R=1/2 of MCS0. A BCC puncturing pattern may be defined for the U-SIG 612 and U-SIG2. In such embodiments, the BCC puncturing pattern applied to the U-SIG2 may be different from that of U-SIG 612 in the frequency domain, for example as described in the PCT/CN2020/106313, the contents of which is incorporated herein in its entirety. The differing BCC puncturing pattern between U-SIG 612 and the U-SIG2 614 may provide 1 to approximately 2 dB diversity gain, which may render the preamble detection of the EHT LPI PPDU 600 more robust.

In some embodiments, a bitwise interleaver scheme may be applied to the U-SIG2 614. In some embodiments, the Interleaver scheme defined in IEEE 802.11 may be re-used to apply the interleaver scheme where the Interleaver parameters such as Ncol, Nrow, and Nrot can be re-used in accordance with the IEEE 802.11 NSD 48 based parameters as described in the PCT/CN2020/106313, the contents of which is incorporated herein in its entirety. Although embodiments are described in relation to IEEE 802.11 defined interleaver schemes, it is to be understood that any other suitable interleaver scheme may be adopted. The bitwise interleaver scheme may provide additional diversity gain for the preamble detection of the EHT LPI PPDU 600.

It is to be appreciated that at least one of the above described DCM application, differing BCC puncturing pattern, and bit-wise interleaver scheme may be applied to an EHT LPI PPDU 600.

Figure 8:
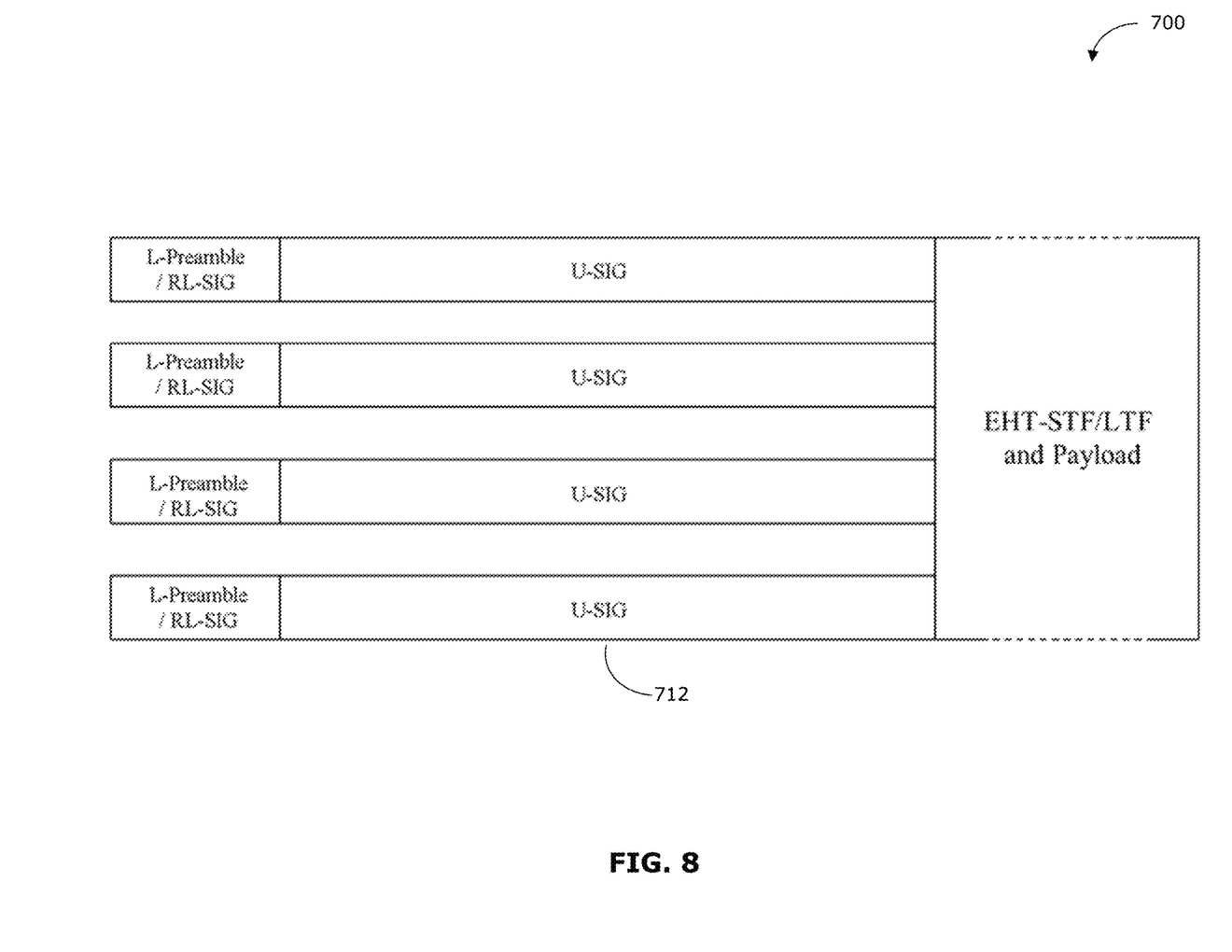
FIG. 8 illustrates a further still embodiment of an EHT LPI PPDU in accordance with embodiments of the present disclosure.

FIG. 8 illustrates a further still embodiment of an EHT LPI PPDU 700 in accordance with embodiments of the present disclosure that may be used for wide BW LPI LR communication. As previously described, the DUP mode is defined for non-punctured preamble with MCS set to MCS0, the NSS is limited to 1, transmission is for a single STA or single user (SU) only. Accordingly, the EHT-SIG field, which is used to encode the MCS and the NSS, and MU communication fields may be omitted. Accordingly, in the EHT LPI PPDU 700 the U-SIG field 712 is immediately followed by ETH-STF, and EHT-SIG field is omitted. In the embodiment shown in FIG. 8, U-SIG 712 may include a subfield that indicates the LPI frame type.

Although the present disclosure may describe methods and processes with steps in a certain order, one or more steps of the methods and processes may be omitted or altered as appropriate. One or more steps may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of all published documents and standards identified in this disclosure are incorporated herein by reference.

The invention claimed is:

1. A method of encoding a physical layer (PHY) protocol data unit (PPDU) for low power indoor (LPI) wireless communication, the method comprising:
    encoding a preamble portion of the PPDU, wherein the encoding further comprises:
        encoding a first universal signal field (U-SIG), the first U-SIG comprising one or more information bits regarding a payload portion of the PPDU;
        encoding a second U-SIG, the second U-SIG including identical one or more information bits regarding the payload portion of the PPDU; and
        encoding a plurality of U-SIGs in addition to the first and second U-SIG, wherein each of the plurality of U-SIGs includes the identical one or more information bits regarding the payload portion of the PPDU, and wherein the second U-SIG and each of the plurality of U-SIGs in addition to the first and second U-SIG represent a respective time domain repetition of the first U-SIG.

2. The method of claim 1, wherein the encoding of the first U-SIG is followed by the encoding of the second U-SIG.

3. The method of claim 1 further comprising applying a Dual sub-Carrier Modulation (DCM) to the second U-SIG.

4. The method of claim 1 further comprising applying a bitwise interleaver scheme to the second U-SIG.

5. The method of claim 1, wherein the first U-SIG and the second U-SIG are encoded with a modulation and coding scheme (MCS) having a code rate greater than one half, the method further comprising:
 adopting a first binary convolution code (BCC) puncturing pattern for the first U-SIG; and
 adopting a second BCC puncturing pattern for the second U-SIG, wherein the second BCC puncturing pattern is different from the first BCC puncturing pattern.

6. The method of claim 1, wherein the LPI wireless communication is defined for an extended range mode of operation.

7. The method of claim 6, where the extended range mode of operation is defined for a MCS scheme of MCS0 using a single spatial stream in non-punctured channels having one of 80 MHz, 160 MHz and 320 MHz bandwidth intended for a single station (STA).

8. An apparatus of an access point (AP), the apparatus comprising a non-transitory memory storage unit, and a processing unit operably coupled to the non-transitory memory storage unit, the processing unit configured to:
 encode a preamble portion of the PPDU for low power indoor (LPI) wireless communication, wherein the preamble portion of the PPDU comprises:
  a first universal signal field (U-SIG), the first U-SIG comprising one or more information bits regarding a payload portion of the PPDU;
  a second U-SIG, the second U-SIG including identical one or more information bits regarding the payload portion of the PPDU; and
  a plurality of U-SIGs in addition to the first and second U-SIG, wherein each of the plurality of U-SIGs includes the identical one or more information bits regarding the payload portion of the PPDU and wherein the second U-SIG and each of the plurality of U-SIGs in addition to the first and second U-SIG represent a respective time domain repetition of the first U-SIG; and
 transmit the encoded PPDU.

9. The apparatus of claim 8, wherein a DCM scheme is applied to the second U-SIG by the processing unit.

10. The apparatus of claim 8, wherein a bitwise interleaver scheme is applied to the second U-SIG by the processing unit.

11. The apparatus of claim 8, wherein the first U-SIG and the second U-SIG are encoded with a modulation and coding scheme (MCS) having a code rate greater than one half, wherein
 a first binary convolution code (BCC) puncturing pattern is applied, by the processing unit, to the first U-SIG; and
 a second BCC puncturing pattern is applied, by the processing unit, to the second U-SIG, wherein the second BCC puncturing pattern is different from the first BCC puncturing pattern.

12. An apparatus of a station (STA), the apparatus comprising a non-transitory memory storage unit, and a processing unit operably coupled to the non-transitory memory storage unit, the processing unit configured to:
 receive a preamble portion of the PPDU, wherein detection further comprises:
  detecting a first universal signal field (U-SIG) in the preamble portion of the PPDU, the first U-SIG comprising one or more information bits regarding a payload portion of the PPDU;
  detecting a second U-SIG, the second U-SIG includes identical one or more information bits regarding the payload portion of the PPDU;
  detecting a plurality of U-SIGs in addition to the first U-SIG and the second U-SIG, wherein each of the plurality of U-SIGs includes the identical one or more information bits regarding the payload portion of the PPDU, and wherein the second U-SIG and each of the plurality of U-SIGs in addition to the first and second U-SIG represent a respective time domain repetition of the first U-SIG;
  combining the plurality of U-SIGs with the first and second U-SIG; and
  decoding the preamble portion of the PPDU based on the combined plurality of U-SIGs and first and second U-SIG.

13. The apparatus of claim 12, wherein prior to combining the first and the second U-SIG, the processing unit is configured to:
 perform a correlation check between the first and the second U-SIG; and
 upon a positive correlation, automatically determine the PPDU is configured for low power indoor (LPI) wireless communication.

14. The apparatus of claim 13, the automatic determining of the PPDU further includes automatically determining a MCS scheme of MCS0 using a single spatial stream in non-punctured channels having one of 80 MHz, 160 MHz and 320 MHz bandwidth intended for a single station (STA).

15. The apparatus of claim 12, wherein the preamble portion further comprises a plurality of U-SIGs in addition to the first and second U-SIG, the processing is further configured to:
 combine the plurality of U-SIGs with the first and the second U-SIG to improve robustness of the preamble portion detection.

16. The apparatus of claim 12, wherein the processing unit is further configured to decode the second U-SIG applied with a DCM scheme.

17. The apparatus of claim 12, wherein the first U-SIG and the second U-SIG in the received preamble portion of the PPDU are encoded with a modulation and coding scheme (MCS) having a code rate greater than one half, the processing unit further configured to detect the first U-SIG having a first binary convolution code (BCC) puncturing pattern; and detect the second U-SIG having a second BCC puncturing pattern, wherein the second BCC puncturing pattern is different from the first BCC puncturing pattern.

18. A method of encoding a physical layer (PHY) protocol data unit (PPDU) for low power indoor (LPI) wireless communication, the method comprising:
 encoding a preamble portion of the PPDU, wherein the encoding further comprises:
  encoding a first universal signal field (U-SIG), the first U-SIG comprising one or more information bits regarding a payload portion of the PPDU without an Extremely High Throughput (EHT) signal field (SIG) in the preamble portion;

encoding a second U-SIG, the second U-SIG including identical one or more information bits regarding the payload portion of the PPDU; and encoding a plurality of U-SIGs in addition to the first and second U-SIG, wherein each of the plurality of U-SIGs includes the identical one or more information bits regarding the payload portion of the PPDU, and wherein the second U-SIG and each of the plurality of U-SIGs in addition to the first and second U-SIG represent a respective time domain repetition of the first U-SIG.

* * * * *